S. G. Darden,
Cotton Cultivator.
No. 90,734. Patented June 1. 1869.
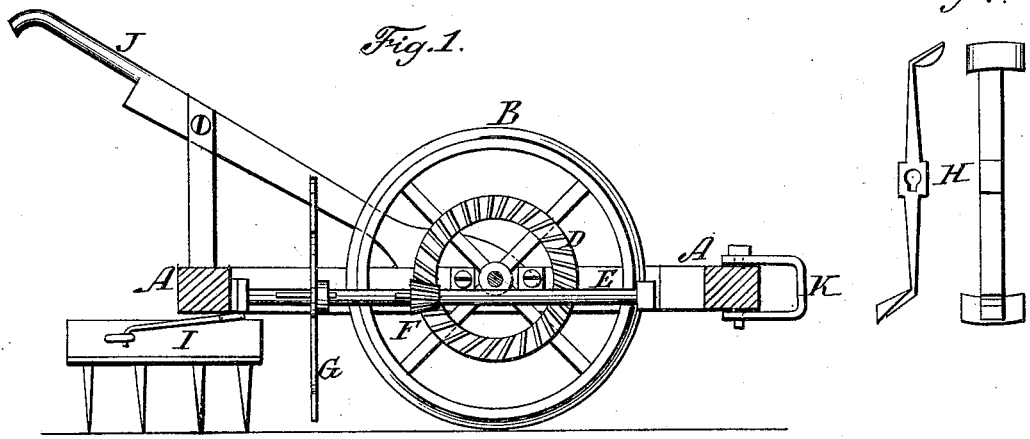
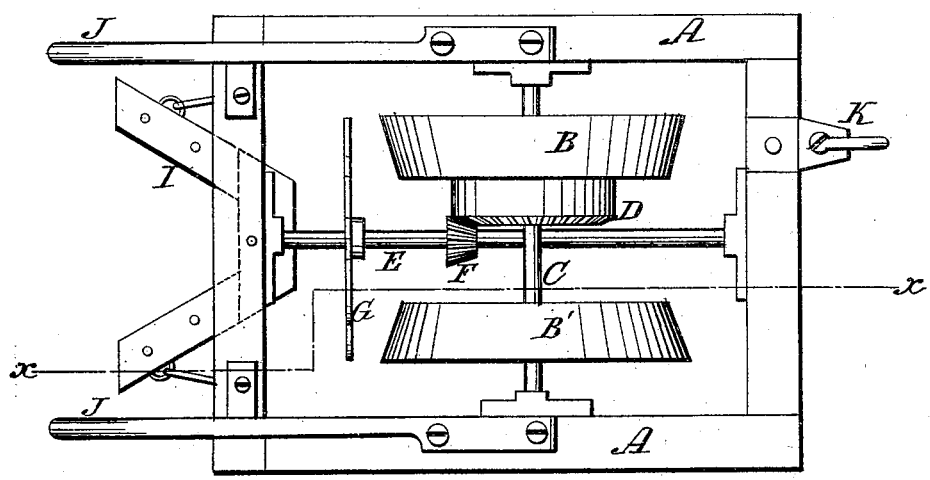
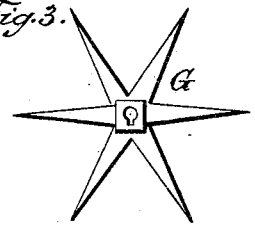
Witnesses.
Chas. Nida
O. Hinchman
Inventor.
S. C. Darden
per Munn & Co.
Att'y

United States Patent Office.

SAMUEL C. DARDEN, OF CONNERSVILLE, MISSISSIPPI.

Letters Patent No. 90,734, dated June 1, 1869.

IMPROVEMENT IN COTTON-CULTIVATOR.

The Schedule referred to in these Letters Patent and making part of the same.

*To all whom it may concern:*

Be it known that I, SAMUEL C. DARDEN, of Connersville, in the county of Marshall, and State of Mississippi, have invented a new and useful Improvement in Cotton-Cultivators; and I do hereby declare that the following is a full, clear, and exact description thereof, which will enable others skilled in the art to make and use the same, reference being had to the accompanying drawings, forming part of this specification.

This invention relates to a new and improved machine for cultivating cotton, whereby much manual labor is saved; and It consists in a machine, so constructed that it may be changed in its parts so as to adapt it for different purposes, or for cultivating cotton-plant in the different stages of its growth, as will be hereinafter more fully described.

In the accompanying plate of drawing—

Figure 1 is a longitudinal vertical section of the implement, through the line $x\ x$ of fig. 2.

Figure 2 is a top or plan view.

Figure 3 is a side view of the revolving harrow.

Figure 4 represents a side and an edge view of the revolving hoe, or chopper, which takes the place of the revolving harrow, when required.

Similar letters of reference indicate corresponding parts.

A represents the frame, to which the operating-parts of the machine are attached.

B B' are the wheels, upon which the machine is supported, and which run on each side of the ridge, or row of cotton.

C represents the axle, or shaft, upon which the wheels are hung.

Upon the inner side of the wheel B, there is fastened a bevel-gear wheel D.

E is a shaft, supported by the frame, which passes lengthwise of the frame, and at right angles with the axle C.

Upon this shaft E there is a bevel-pinion, F, which meshes into the wheel D, by which means the shaft E is revolved, when the machine is in motion.

Upon this shaft is placed the revolving harrow G, as represented in the drawing, but which is readily removed therefrom, so as to make way for the revolving hoe, or chopper H, fig. 4, which is to be used when the cotton-plant is in a more advanced state.

I represents a removable triangular harrow, which is attached to the rear end of the frame, as represented.

J J represent the handles, by which the machine is guided.

K is the draught-clevis, which, as seen, is on one side of the centre, to allow the horse to walk between the rows.

When the machine is in operation for the first time, on the young cotton-plant, "soon after it is up," the harrow behind is to run on either side of the row, while the revolving teeth, or harrow G pass directly through the cotton, tearing up the young grass, and thinning out the large bunches of cotton. This is the first cleaning of the cotton.

After the plant has stood a sufficient length of time, the hoes are substituted for the revolving harrow-teeth G, which hoes act as "choppers," and revolve in the same manner as the harrow-teeth.

When the choppers have been sufficiently used, the second cleaning is completed, and the cotton is making lines, or rows.

With this machine, double the number of acres of cotton can be cultivated than can be by the old weeding-hoe method, thus dispensing with a vast amount of hand-labor, and consequently lessening the cost and the time employed in the cultivation.

Having thus described my invention,

I claim as new, and desire to secure by Letters Patent—

A convertible cotton-cultivator, constructed and operating substantially as herein shown and described, that is to say, with the driving, or traction-wheels B B', gear-wheel and pinion D and F, shafts C and E, revolving teeth, or harrow G, and choppers H, and triangular harrow I, arranged substantially as and for the purposes set forth.

SAML. C. DARDEN.

Witnesses:
   JAS. P. ALVIS,
   M. F. WILLIS.